(12) United States Patent
Gardner et al.

(10) Patent No.: US 9,772,248 B2
(45) Date of Patent: Sep. 26, 2017

(54) HIGH PRESSURE FLAT PLATE TRANSDUCER

(71) Applicant: Kulite SemiConductor Products, Inc., Leonia, NJ (US)

(72) Inventors: Robert Gardner, Westwood, NJ (US); Louis DeRosa, Wayne, NJ (US); Leo Geras, Pearl River, NY (US); Dick Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 50 days.

(21) Appl. No.: 14/659,667

(22) Filed: Mar. 17, 2015

(65) Prior Publication Data
US 2015/0260603 A1 Sep. 17, 2015

Related U.S. Application Data

(63) Continuation-in-part of application No. 14/481,996, filed on Sep. 10, 2014, now Pat. No. 9,360,389.
(Continued)

(51) Int. Cl.
*G01L 19/00* (2006.01)
*G01L 19/14* (2006.01)

(52) U.S. Cl.
CPC ........ *G01L 19/147* (2013.01); *G01L 19/0038* (2013.01); *G01L 19/144* (2013.01); *Y10T 29/49826* (2015.01); *Y10T 29/49947* (2015.01)

(58) Field of Classification Search
CPC ........ G01D 11/24; G01D 11/245; G01L 19/14
(Continued)

(56) References Cited

U.S. PATENT DOCUMENTS

| 4,903,164 A | 2/1990 | Bishop et al. |
| 5,948,988 A * | 9/1999 | Bodin ................. G01L 19/0038 73/706 |

(Continued)

FOREIGN PATENT DOCUMENTS

| CN | 202453140 U * | 9/2012 |
| EP | 0735353 A1 | 3/1995 |
| WO | 2015092997 A1 | 6/2015 |

OTHER PUBLICATIONS

United Kingdom Patent Application No. 1504437.3 Search Report Mailed Sep. 2, 2015.

*Primary Examiner* — Lisa Caputo
*Assistant Examiner* — Jamel Williams
(74) *Attorney, Agent, or Firm* — Troutman Sanders LLP; James E. Schutz; Mark Lehi Jones

(57) ABSTRACT

This disclosure provides example systems and methods for high pressure flat plate transducer assemblies. A first example embodiment of the transducer assembly is provided, which includes a transducer, a housing, and a transducer header. The transducer header can be configured for accepting the transducer and for mating with the housing at an interface between the header back side and the housing. The first embodiment of the transducer assembly is configured such that a pressure exerted on the transducer compresses the interface between the header back side and the housing. A second example embodiment is provided that includes a one-piece housing having a built-in header portion configured for accepting the transducer. In this second embodiment, the interface adapter is configured for attaching to a mating surface and to the housing. In the second example embodiment, the transducer assembly is configured such that the pressure presses the transducer against the housing.

14 Claims, 6 Drawing Sheets

Related U.S. Application Data

(60) Provisional application No. 61/954,560, filed on Mar. 17, 2014.

(58) Field of Classification Search
USPC .......................................................... 73/431
See application file for complete search history.

(56) References Cited

U.S. PATENT DOCUMENTS

| | | | | |
|---|---|---|---|---|
| 6,255,728 B1* | 7/2001 | Nasiri | ................ | G01L 19/0038 |
| | | | | 257/666 |
| 7,212,096 B2* | 5/2007 | Kurtz | ................ | G01L 19/0645 |
| | | | | 338/36 |
| 7,377,177 B1* | 5/2008 | Lamb | ................ | G01L 19/147 |
| | | | | 73/756 |
| 7,748,276 B2* | 7/2010 | Kaneko | ................ | G01L 9/0051 |
| | | | | 73/720 |
| 8,371,175 B2* | 2/2013 | Romo | ................ | G01L 19/0007 |
| | | | | 73/753 |
| 8,459,125 B2* | 6/2013 | Wade | ................ | G01L 19/0007 |
| | | | | 73/753 |
| 2005/0204823 A1* | 9/2005 | Murai | ................ | G01L 19/0084 |
| | | | | 73/724 |
| 2005/0210992 A1* | 9/2005 | Tohyama | ............. | G01L 19/003 |
| | | | | 73/715 |
| 2005/0248434 A1* | 11/2005 | Kurtz | ................ | B23K 15/0053 |
| | | | | 338/42 |
| 2007/0089523 A1* | 4/2007 | Tohyama | ............. | G01L 19/003 |
| | | | | 73/715 |
| 2016/0146691 A1* | 5/2016 | Yamada | ............. | G01L 19/0015 |
| | | | | 73/723 |

* cited by examiner

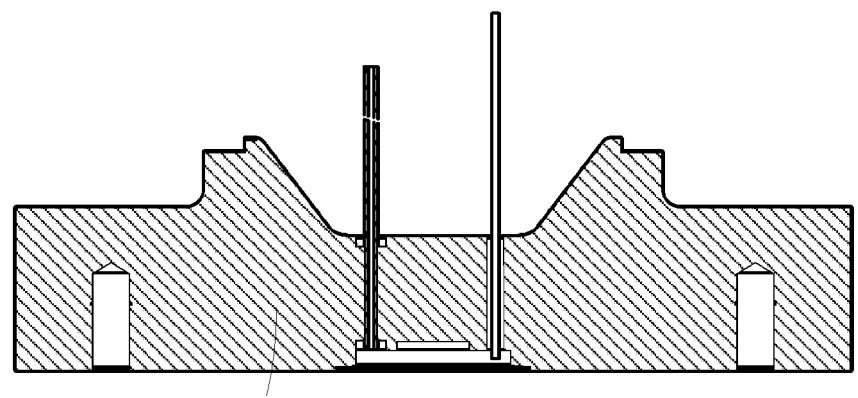
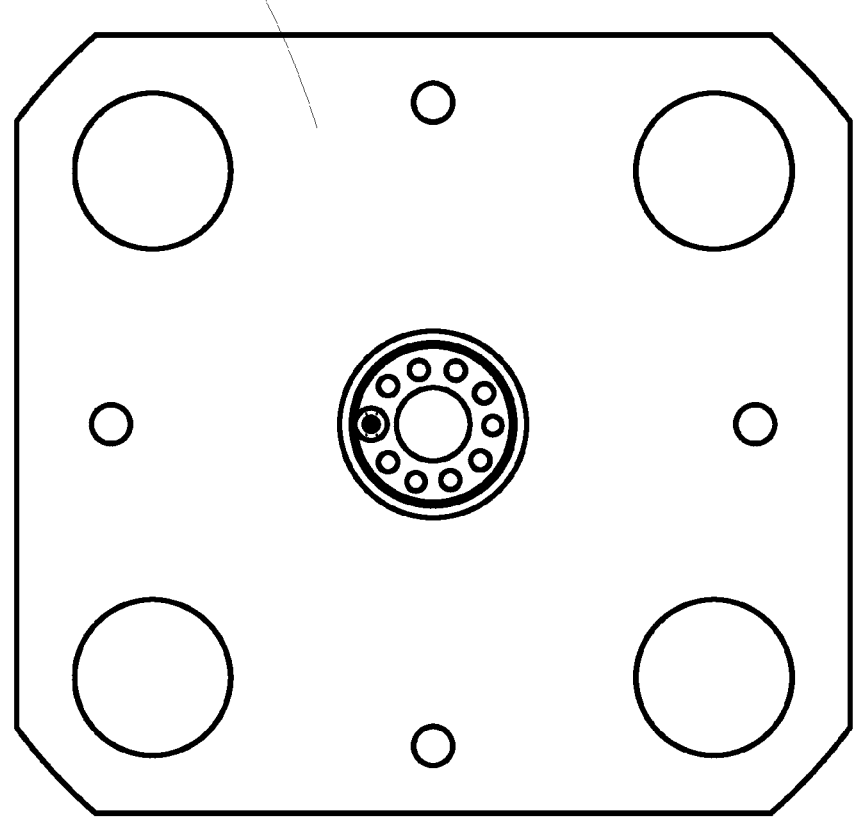
FIG. 4B
FIG. 4A

HIGH PRESSURE FLAT PLATE TRANSDUCER

RELATED APPLICATIONS

This application is a Continuation-in-Part of U.S. patent application Ser. No. 14/481,996 entitled "High Pressure Flat Plate Transducer," filed 10 Sep. 2014. This application also claims priority to U.S. Provisional Patent Application Ser. No. 61/954,560, entitled: "High Pressure Flat Plate Transducer Assembly," filed Mar. 17, 2014, the contents of which are incorporated by reference in their entirety as if fully set forth herein.

TECHNICAL FIELD

This disclosure generally relates to transducers and more particularly to a high pressure flat plate transducer assembly.

BACKGROUND

There are many different ways to interface a pressure transducer to a system to be measured. Threads, crush rings, ferules, and O-rings are all ways to connect the transducer and each one has different benefits and drawbacks depending on the conditions of the test. A face seal O-ring is often used on Aircraft systems because it allows for easy connection to the system while maintaining the correct orientation at all times.

FIG. 1 shows a prior art transducer assembly 100 having a face seal O-ring. A flat plate 101 is used to form an O-ring seal. The flat plate 101 may also include an O-ring groove. Further, the O-ring groove may be located on the mating surface. An aperture 102 may be used to bolt the transducer to the test system. A transducer 104 may be mounted onto a header 103. For many systems, this configuration works well. However, when high pressure systems are tested, this configuration may be problematic. Since the header 103 is typically welded onto the back side 106 of a housing, the weld is under tension when pressurized. This can cause failures when the pressure is too high or under cyclic loading over long time periods. Accordingly, there is a need for techniques to allow for a high pressure flat plate transducer assembly. In addition, other desirable features and characteristics of the present disclosure will become apparent from the subsequent detailed description and claims, taken in conjunction with the accompanying figures and the foregoing technical field and background.

BRIEF SUMMARY OF THE DISCLOSURE

Briefly described, example embodiments of the disclosure relate to a high pressure flat plate transducer assembly. Certain example implementations of the disclosed technology include a transducer assembly. In one example implementation, the transducer assembly may include a transducer, a one-piece housing having a front side configured for accepting the transducer, and an interface adapter. The interface adapter can include an adapter front side configured for attaching to a mating surface, an adapter back side configured to mate with the housing, and a cavity extending from at least a portion of the adapter front side to the adapter back side and configured to communicate a pressure to the transducer. In this example embodiment, the transducer assembly is configured such that the pressure presses the transducer against the housing.

According to an example implementation of the disclosed technology, another transducer assembly is provided, which includes a transducer, a housing, and a transducer header. The transducer header can include a header front side configured for accepting the transducer and a header back side configured for mating with the housing at an interface between the header back side and the housing. The transducer assembly is configured such that a pressure exerted on the transducer compresses the interface between the header back side and the housing.

Certain example implementations include a method. The method can include attaching a pressure transducer to a one-piece housing, the one-piece housing including a header portion configured for accepting and mating with the pressure transducer, and wherein the pressure transducer is configured to press against the one-piece housing as pressure is communicated to the pressure transducer. The method can further include attaching at least a portion of the housing to a portion of an interface adapter.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 4A depicts a front view of a one-piece housing 402, according to an example implementation of the disclosed technology.

FIG. 4B depicts a side cross-sectional view of the one-piece housing 402, according to an example implementation of the disclosed technology

DETAILED DESCRIPTION

Figure 1:
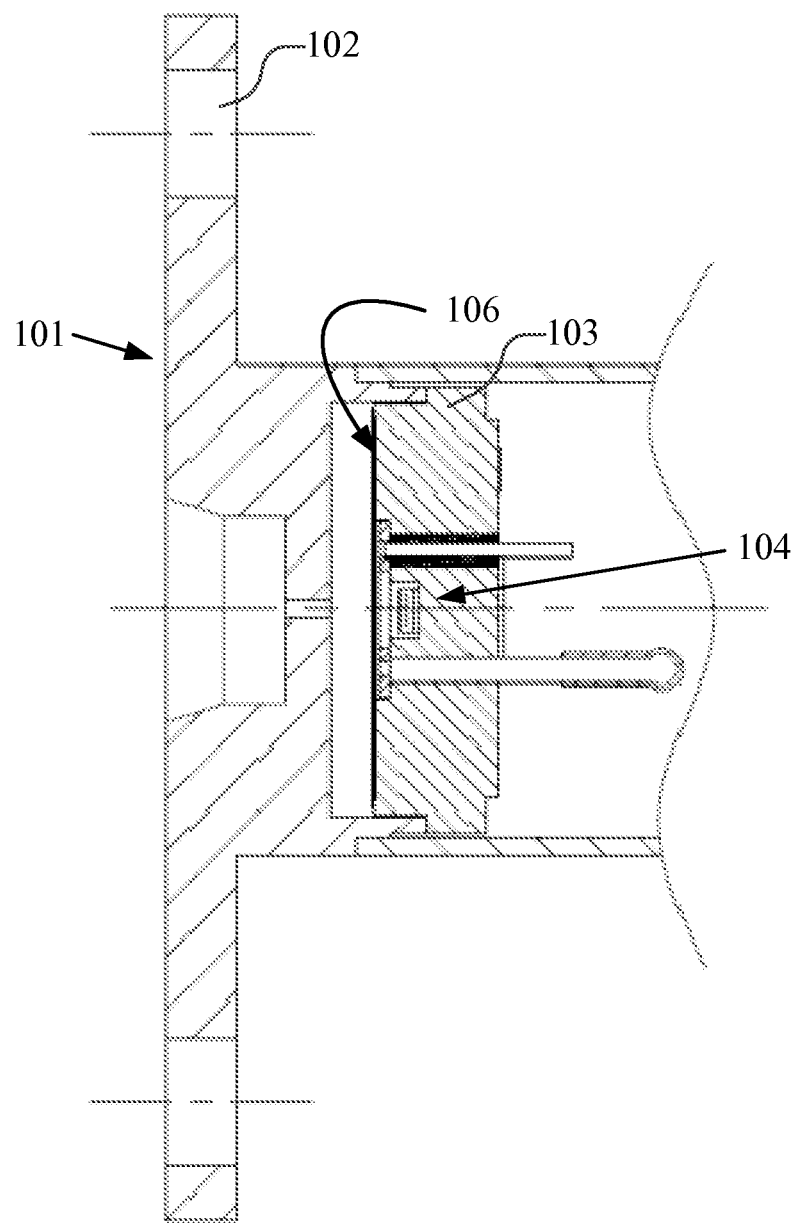
FIG. 1 illustrates a prior art transducer having a face seal O-ring.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a high pressure flat plate transducer assembly. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

The disclosed technology relates to a flat interface pressure transducer assembly. In a first example embodiment, the transducer assembly may include separate header and housing components arranged such that a header weld between the header and housing in the assembly is in compression during operation to avoid failure at high pressure or after many pressure cycles such as at mid-range pressures.

The disclosed technology further includes a second example embodiment in which the transducer assembly can include a one-piece housing with a built-in header portion that may be utilized to eliminate the need for a separate header (and associated weld). Certain example implementations may enable a reduction in the size of the transducer assembly.

Figure 2:
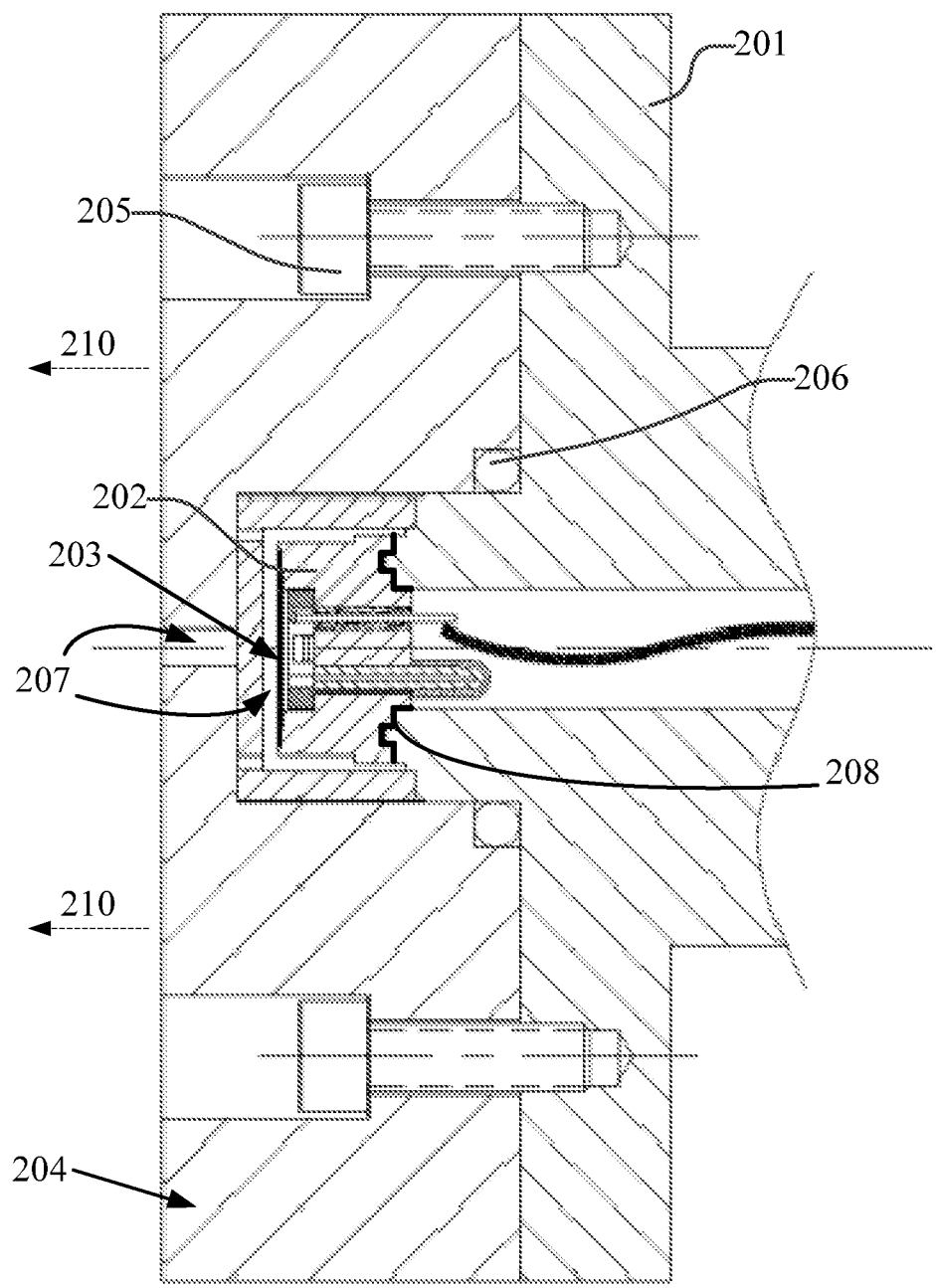
FIG. 2 illustrates one embodiment of a high pressure flat plate transducer assembly 200 in accordance with various aspects set forth herein.

FIG. 2 illustrates an example first embodiment of a high-pressure flat plate transducer assembly 200, in accordance with various aspects set forth herein. In an example implementation, the assembly 200 may have an associated front or mating portion (for example, as shown in the left side of FIG. 2) that may be utilized to interface with a mating surface 210 (not shown) via an interface adaptor 204. In certain example implementations, the interface adaptor 204 may be configured with various standard or custom geometries, shapes, sizes, materials, etc. to accommodate various mating test surfaces 210. In this respect, one aspect of the disclosed technology provides a means for accommodating a wide range of mating surfaces 210 (and possible obstructions) by customizing the interface adaptor 204 while the other associated parts (as will be explained below) may be standardized.

According to an example implementation of the disclosed technology, the interface adaptor 204 may include a back portion (for example, opposite the mating portion) that is configured with a recess for accepting one or more of a transducer 203, an associated transducer header 202, and a portion of a housing 201. For example, the transducer 203 may be mounted or attached to the transducer header 202. In an example implementation, the transducer header 202 may be attached to the housing 201 at an interface 208. In an example implementation, the transducer header 202 may be attached and/or secured to the housing 201 with a weld along at least a portion of the interface 208 between the housing 201 and the transducer header 202.

In one example implementation, the interface adaptor 204 may be mounted and/or secured to the housing 201 with a fastener 205 such as a bolt, a screw, a clip, a weld, a press fit or the like. The interface adaptor 204 may be sealed against the housing 201, for example, with a gasket 206 such as an O-ring, a packing, a toric joint or the like. By sealing the interface adaptor 204 to the housing 201, the pressure may enter a cavity 207 and may be transferred to the transducer header 202 and/or the transducer 203 without leaking out.

As indicated in FIG. 2, the arrangement and/or orientation of the transducer 203, the transducer header 202, and the housing 201 enables the interface 208 region to be under compression, for example, when pressure builds up in the cavity 207 and presses the transducer header 202 towards the housing 201. This disclosed feature may provide increased reliability of a weld along at least a portion of the interface 208 between the housing 201 and the transducer header 202.

The disclosed example implementation of the transducer assembly 200 provides a technical benefit being able to sustain higher pressures without failure since the transducer header 202 is configured to be in compression during operation. Another technical benefit of the disclosed configuration of the transducer assembly 200 is that, due to a reduced volume of the cavity 207, the transducer assembly 200 may have an extended high frequency response compared with prior art configurations. Further, another technical benefit of the disclosed transducer assembly 200 includes allowance for different interface adaptors 204 to be mated with the housing 201 providing, for instance, faster or easier installation and/or streamlined production of the various components.

Figure 3:
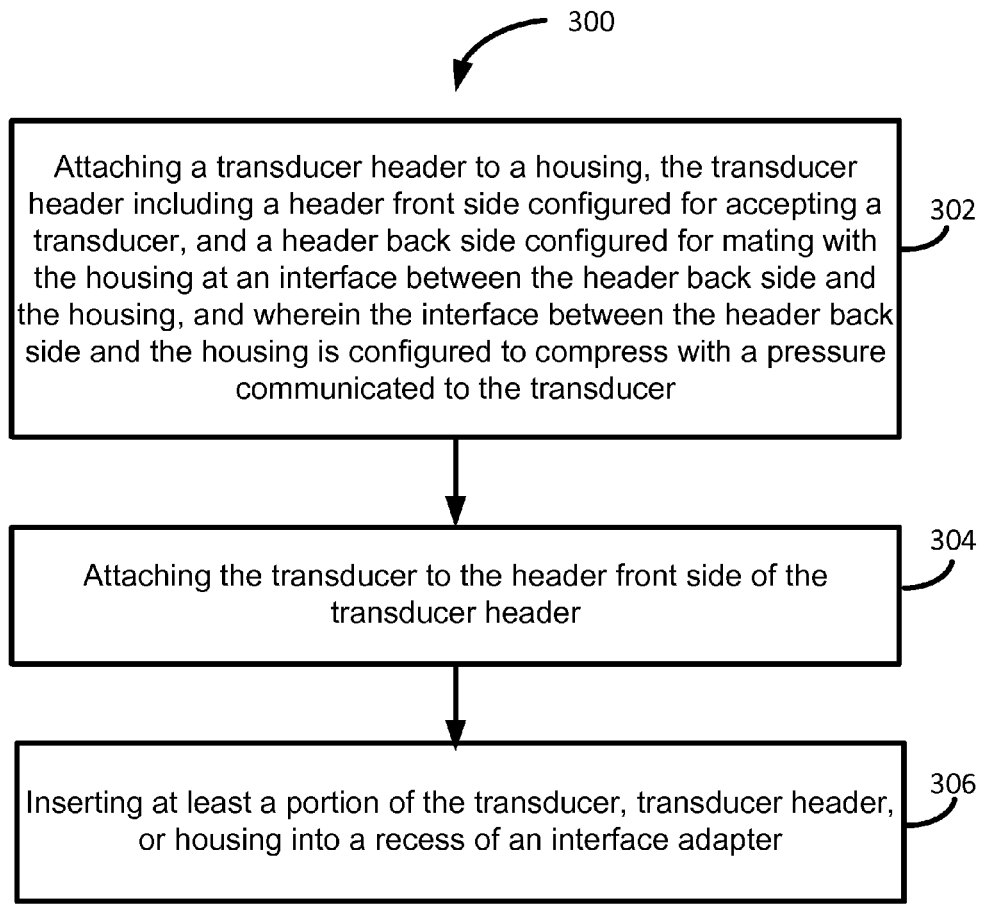
FIG. 3 is a flow-diagram of a method 300, according to an example implementation of the disclosed technology.

FIG. 3 is a flow-diagram of a first method 300, according to an example implementation of the disclosed technology. In block 302, the method 300 includes attaching a transducer header to a housing, the transducer header includes a header front side configured for accepting a transducer and a header back side configured for mating with the housing at an interface between the header back side and the housing, the interface between the header back side and the housing is configured to compress with a pressure communicated to the transducer. In block 304, the method 300 includes attaching the transducer to the header front side of the transducer header. In block 306 the method 300 includes inserting at least a portion of the transducer, transducer header, or housing into a recess of an interface adapter.

Certain example implementations of the disclosed technology include transducer assembly 200. In a first example embodiment, the transducer assembly 200 may include a transducer 203, a housing 201, and a transducer header 202. In certain example implementations, the transducer header 202 may include a header front side configured for accepting the transducer 203 and a header back side configured for mating with the housing 201 at an interface 208 between the header back side and the housing 201.

Certain example implementations may also include an interface adapter 204. The interface adapter 204 can include an adapter front side configured for attaching to a mating surface 210, an adapter back side configured to accept the transducer header 202, and a cavity 207 extending from at least a portion of the adapter front side to the adapter back side and configured to communicate a pressure to the transducer 203. In accordance with an example implementation of the disclosed technology, the first embodiment of the transducer assembly 200 may be configured such that the pressure compresses the interface 208 between the header back side and the housing 201.

According to an example implementation of the disclosed technology, the transducer assembly 200 may include a seal or gasket 206 disposed between the housing 201 and the interface adapter 204. The seal or gasket 206 may be configured to withstand and retain the pressure communicated to the transducer 203 and/or the transducer header 202.

According to a first example embodiment of disclosed technology, the interface 208 between the header back side and the housing 201 comprises a weld.

In certain example implementations, the interface adapter 204 may include a recess on the adapter back side. The recess may be configured to accept at least a portion of the transducer header 202.

In certain example implementations, the interface adapter 204 can include a recess on the adapter back side, for example, to accept at least a portion of the housing 201.

In other example implementations, as will be discussed below with reference to FIG. 5, a second example embodiment of the housing 402 may couple to a second example embodiment of the interface adapter 404 in a flat arrangement without protruding into the interface adapter 404.

According to an example implementation of the disclosed technology, the transducer may configured to measure a pressure. According to an example implementation of the disclosed technology, the interface adapter 204 may be attached to the housing 201 with one or more fasteners 205.

FIG. 4A depicts a front view of a one-piece housing 402, according to a second example implementation of the disclosed technology.

FIG. 4B depicts a side cross-sectional view of the one-piece housing 402, according to the second example implementation of the disclosed technology. In this second example embodiment, (and in comparison with the first example embodiment as shown in FIG. 2), the transducer assembly can include a one-piece housing with a built-in header portion that may be utilized to eliminate the need for a separate header (and associated weld).

Figure 5:
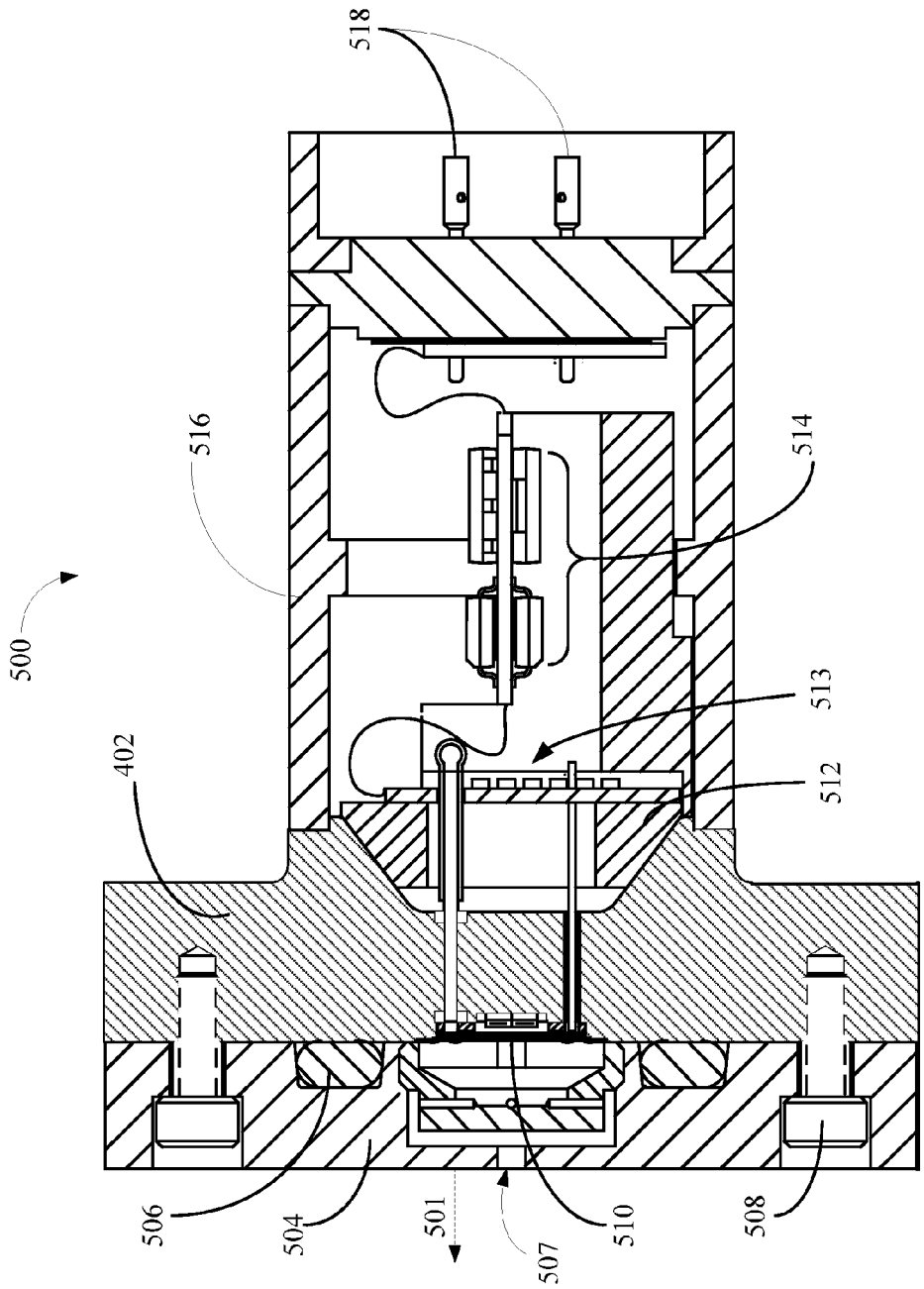
FIG. 5 depicts an example embodiment of a high pressure flat plate transducer assembly 500 with the one-piece housing 402 configured for mating with a transducer 510 and an interface adapter 504, according to an example implementation of the disclosed technology.

FIG. 5 depicts a second example embodiment of a high pressure flat plate transducer assembly 500 with the one-piece housing 402 configured for mating with a transducer 510 and an interface adapter 504, according to an example implementation of the disclosed technology. In this second example embodiment, the assembly 500 may have an associated front or mating portion (for example, as shown in the left side of FIG. 5) that may be utilized to interface with a mating surface 501 (not shown) via an interface adaptor 504. In certain example implementations, the interface adaptor 504 may be configured with various standard or custom geometries, shapes, sizes, materials, etc. to accommodate various mating test surfaces 501. In this respect, one aspect of the disclosed technology provides a means for accommodating a wide range of mating surfaces 501 (and possible obstructions) by customizing the interface adaptor 504 while the other associated parts (as will be explained below) may be standardized.

According to an example implementation of the disclosed technology, the interface adaptor 504 may include a back portion (for example, opposite the mating portion) that is configured with a recess for accepting a transducer 510. In an example implementation, the transducer 510 may be attached to the housing 402, for example, at an interface between the interface adaptor 504 and the housing 402. In this example implementation, the housing 402 may act as a transducer header, thereby eliminating the need for the separate header, as discussed above with respect to the first example embodiment as shown in FIG. 2.

In accordance with certain example implementations, the interface adaptor 504 may be mounted and/or secured to the housing 402 with a fastener 508 such as a bolt, a screw, a clip, a weld, a press fit or the like. In certain example implementations, the interface adaptor 504 may be sealed against the housing 402, for example, with a gasket 506 such as an O-ring, a packing, a toric joint or the like. By sealing the interface adaptor 504 to the housing 402, the pressure may enter a cavity 507 and may be transferred to the transducer 510 without leaking out.

As indicated in FIG. 5, the arrangement and/or orientation of the transducer 510 and the housing 402 enables the transducer 510 and the housing 402 to be under compression, for example, when pressure builds up in the cavity 507 and presses the transducer 510 towards the housing 402. This disclosed feature may provide increased reliability by eliminating a separate header and associated weld. Certain example implementations of the disclosed technology can include a transducer assembly with a weldless housing, for example, to provide support for the transducer and/or to withstand applied pressures. In accordance with certain example implementations of the disclosed technology, the transducer assembly is configured such that the one-piece housing provides support for the transducer such that the assembly can withstand the exerted pressure (under normal pressure ranges) without deforming.

In an example implementation, the transducer assembly 500 provides a potential technical benefit of being able to sustain higher pressures without failure. Another potential technical benefit associated with certain disclosed configurations of the transducer assembly 500 may include an extended high frequency response. In certain implementations, the extended high frequency response may be due to a reduced volume of the cavity 507, as compared with prior art configurations. Further, another technical benefit of certain disclosed configurations of the transducer assembly 500 is an allowance for different interface adaptors 504 to be mated with the housing 402 providing, for instance, faster or easier installation and/or streamlined production of the various components. Another technical benefit of an example configuration of the transducer assembly 500 is that a smaller assembly may be manufactured. Yet another technical benefit of an example configuration of the transducer assembly 500 is that certain parts and processing steps may be eliminated without compromising the reliability of the assembly.

With continued reference to FIG. 5, the transducer assembly 500 may include additional features to enable mounting and securing of associated electronic and mechanical components, and for providing various interfaces for powering the assembly 500 and for interfacing and routing the associated pressure measurement signals to external measurement equipment. For example the transducer assembly 500 may include a mount 512 configured for securing one or more electronics boards 513 within the assembly 500. In one example implementation, the mount 512 may couple to a portion of the housing 402. In certain example implementations, the transducer assembly 500 can include a sleeve or body portion 516 for interfacing with the housing 402 and for providing protection and/or additional mounting, for example, for the electronics board 513 and/or additional electronics components and circuitry 514. In certain example implementations, the sleeve or body portion 516 may be configured to secure various terminals 518 for providing the various interfaces for powering the assembly 500 and for interfacing and routing the associated pressure measurement signals to external measurement equipment.

Figure 6:
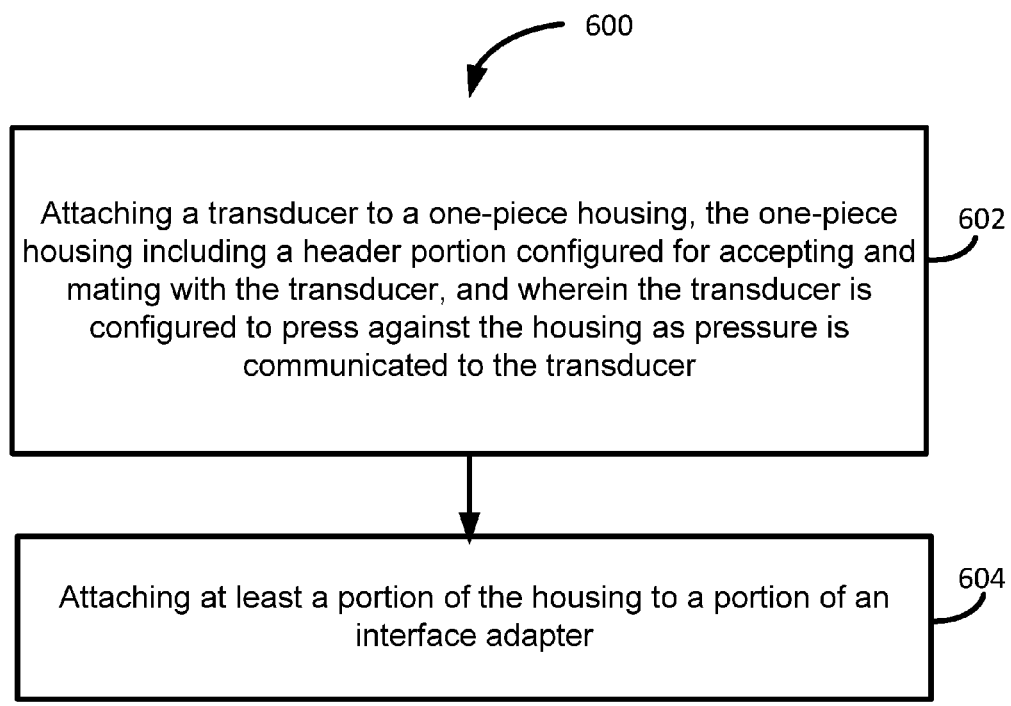
FIG. 6 is a flow-diagram of a method 600, according to an example implementation of the disclosed technology.

FIG. 6 is a flow-diagram of a second method 600, according to as second example implementation of the disclosed technology. In block 602, the method 600 includes attaching a transducer to a one-piece housing, the one-piece housing including a header portion configured for accepting and mating with the transducer, and wherein the transducer is configured to press against the housing as pressure is communicated to the transducer. In block 604, the method includes attaching at least a portion of the housing to a portion of an interface adapter.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned high pressure flat plate transducer assembly, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

We claim:

1. A transducer assembly, comprising:
    a transducer apparatus comprising a transducer;
    a one-piece housing comprising a front side configured for accepting the transducer apparatus; and
    an interface adapter attached to and compressed against the one-piece housing with one or more fasteners, the interface adapter comprising:
        an adapter front side configured for attaching to a mating surface;
        an adapter back side configured to mate with the one-piece housing; and
        a cavity extending from at least a portion of the adapter front side to the adapter back side and configured to communicate a pressure to the transducer;
    wherein the transducer assembly is configured such that the pressure presses at least a portion of the transducer apparatus directly against the one-piece housing.

2. The transducer assembly of claim 1, further comprising a seal or gasket disposed between the one-piece housing and the interface adapter.

3. The transducer assembly of claim 2, wherein the seal or gasket is configured to withstand and retain the pressure communicated to the transducer or the one-piece housing.

4. The transducer assembly of claim 1, wherein the interface adapter comprises a recess on the interface adapter back side, the recess configured to accept at least a portion of the transducer.

5. The transducer assembly of claim 1, wherein the transducer is a pressure transducer.

6. The transducer assembly of claim 1, further comprising a body in communication with the one-piece housing, the body configured for securing one or more electronic components.

7. The transducer assembly of claim 6, wherein the body is further configured for securing one or more electrical terminals, the one or more electrical terminals configured for communication with the one or more electronic components.

8. A transducer assembly, comprising:
    a pressure transducer apparatus comprising a pressure transducer;
    a one-piece housing comprising a front side configured for accepting the pressure transducer apparatus; and
    an interface adapter attached to and compressed against the one-piece housing with one or more fasteners;
    wherein the transducer assembly is configured such that the pressure presses at least a portion of the pressure transducer apparatus directly against the one-piece housing.

9. The transducer assembly of claim 8, wherein the interface adapter includes:
    an adapter front side configured for attaching to a mating surface;
    an adapter back side configured to mate with the one-piece housing; and
    a cavity extending from at least a portion of the adapter front side to the adapter back side and configured to communicate a pressure to the pressure transducer.

10. The transducer assembly of claim 9, further comprising a seal or gasket disposed between the one-piece housing and the interface adapter.

11. The transducer assembly of claim 8, further comprising a body in communication with the one-piece housing, the body configured for securing one or more electronic components.

12. A method comprising:
   attaching a pressure transducer apparatus comprising a pressure transducer to a one-piece housing, the one-piece housing including a header portion configured for accepting and mating with the pressure transducer apparatus, and wherein at least a portion of the pressure transducer apparatus is configured to directly press against the one-piece housing as pressure is communicated to the pressure transducer; and
   attaching, with one or more fasteners, at least a portion of the housing to a portion of an interface adapter, wherein at least a portion the interface adapter is compressed against the one-piece housing with the one or more fasteners.

13. The method of claim 12, further comprising installing a seal or gasket between the housing and the interface adapter.

14. The method of claim 13, wherein the seal or gasket is configured to withstand and retain the pressure communicated to the pressure transducer or the one-piece housing.

* * * * *